United States Patent [19]

Olsen et al.

[11] Patent Number: 5,235,226

[45] Date of Patent: Aug. 10, 1993

[54] HIGHLY CONDUCTIVE LAYER ARRANGEMENT FOR A LINEAR MOTOR SECONDARY

[75] Inventors: Eric G. Olsen, Woodbury; Ernest P. Gagnon, Machester; Jerome F. Jaminet, Glastonbury, all of Conn.

[73] Assignee: Otis Elevator Company, Farmington, Conn.

[21] Appl. No.: 819,706

[22] Filed: Jan. 13, 1992

[51] Int. Cl.5 .......................................... H02K 41/00
[52] U.S. Cl. ........................................ 310/12; 187/112
[58] Field of Search ...................... 310/12, 13, 14, 27; 318/119, 135; 187/112

[56] References Cited

U.S. PATENT DOCUMENTS

| 5,062,501 | 11/1991 | Pavoz et al. | 187/112 |
| 5,086,881 | 2/1992 | Gagnon et al. | 310/12 X |
| 5,090,516 | 2/1992 | Grinaski | 187/112 |

FOREIGN PATENT DOCUMENTS 0073865 4/1988 Japan.
0214464 8/1990 Japan.

OTHER PUBLICATIONS

Linear Motion Electric Machines, "Certain Phenomena in Short Primary Lims", pp. 55–57 (Designated Reference "A"), 1976.
Linear Electric Motors: Theory, Design, and Practical Applications; pp. 49, 61–67, (Designated Reference "B"), 1987.

Primary Examiner—Steven L. Stephan
Assistant Examiner—Ed To
Attorney, Agent, or Firm—Richard D. Getz

[57] ABSTRACT

A layer of highly conductive material is provided which forms a complete electrical path about the secondary of a linear motor, perpendicular to the face of the secondary. The layer comprises a section of highly conductive material attached to each face of the secondary communicating with a primary. In one embodiment, the layer completely encircles the secondary. In other embodiments, electrically conductive means join the sections of the layer, thereby creating the complete electrical path about the secondary.

3 Claims, 3 Drawing Sheets

HIGHLY CONDUCTIVE LAYER ARRANGEMENT FOR A LINEAR MOTOR SECONDARY

TECHNICAL FIELD

This invention relates to an elevator linear motor drive assembly.

BACKGROUND ART

Linear motors having a flat secondary and a flat, mobile primary(s) may be employed as drive means for elevators. In one linear motor embodiment, a rail fixedly mounted in the hoistway acts as the secondary and guide for the primary(s) of the linear motor. The primary(s) attaches to and drives either the elevator car or the counterweight. This embodiment advantageously fits within the hoistway, thereby eliminating the need for a separate machine room.

Each primary typically comprises a backing plate, a plurality of laminated plates and a plurality of windings. The laminated plates, which include a plurality of slots, attach to the backing plate to form the body of the primary. The slots within the laminated plates cumulatively form channels that run across the width of the primary. A plurality of windings or coils rest in the channels. Each coil is a complete path having two straight lengths connected together on each side of the primary by a coil end. One straight length of the coil rests in a first channel and the other straight length rests in a second channel separated from the first channel by a specific distance generally equal to a pole pitch.

The secondary comprises a ferromagnetic material commonly having a rectangular shape. The width and length of the secondary define the faces of the secondary. The width of the secondary is in register with the width of the primary(s). A layer of highly conductive material is fixed to each secondary face. When current passes through a coil, a magnetic field is created around the coil, perpendicular to the direction of the current. The magnetic field accesses the ferromagnetic material of both the primary and the secondary, thereby creating an attractive force between the primary and secondary.

The current in the primary coils also produces oppositely directed induced currents within the highly conductive layer fixed to the secondary. The induced currents interact with the magnetic field created by the current passing through the primary coils to create a thrust force on the primary. The strength of the induced current is directly related to the strength of the thrust force on the primary. Therefore, it is advantageous to minimize any resistance to the induced current.

It is known in the art that induced currents in the highly conductive layer run parallel to the current in the primary coils. Parallel current patterns running lengthwise in a multi-section secondary present two problems. First, electrical connections between the sections of the secondary are required. A parallel pattern running lengthwise along a secondary becomes discontinuous as it passes a seam, thereby negatively effecting the integrity of the motor, unless electrical connectors connect the sections. Second, parallel induced currents mirror the relatively long current path in the primary coils. As in most materials, the resistivity of the highly conductive layer is a linear function. The overall resistivity of the induced current path, therefore, increases with the length of the path.

In sum, what is needed is a way to minimize the amount of resistance the induced currents encounter.

DISCLOSURE OF THE INVENTION

It is, therefore, an object of the present invention to increase the efficiency of a linear motor.

It is a further object of the present invention to minimize the resistance to currents induced by the primary(s) of the linear motor.

According to the present invention, a layer of highly conductive material is provided which forms a complete electrical path about the secondary of a linear motor, perpendicular to the face of the primary. The layer comprises a section of highly conductive material attached to each face of the secondary communicating with a primary. In one embodiment, the layer completely encircles the secondary. In other embodiments, electrically conductive means join the sections of the layer, thereby creating the complete electrical path about the secondary.

The complete electrical path around the secondary, perpendicular to the primary, provides two significant advantages. First, currents which follow paths perpendicular to the primary, do not require electrical connectors between sections of the layer of highly conductive material. Second, currents which travel paths perpendicular to the primary and secondary travel a shorter distance than those that run parallel, mirroring the currents within the primary coils. As a result, the overall resistance experienced by the induced currents decreases.

These and other objects, features and advantages of the present invention will become more apparent in light of the detailed description of the best mode embodiment thereof, as illustrated in the accompanying drawings.

BEST MODE FOR CARRYING OUT THE INVENTION

Figure 1:
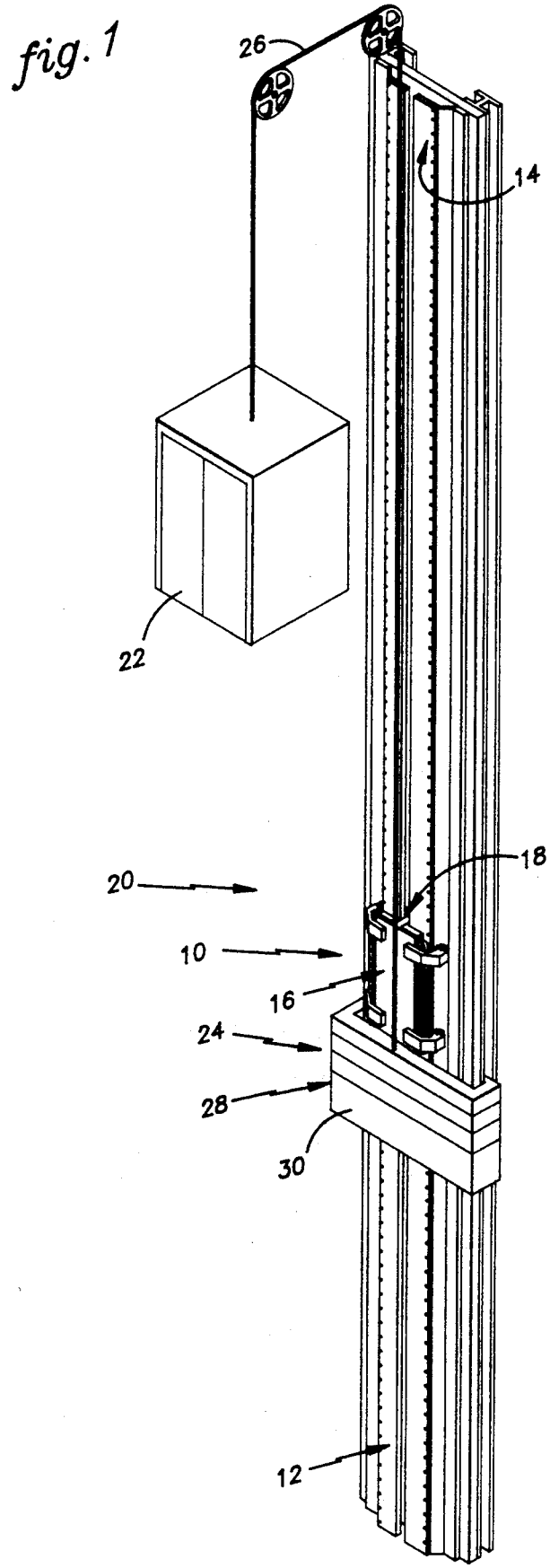
FIG. 1 is a schematic view of counterweight assembly, comprising a linear motor as a drive means, attached to an elevator car.

Referring to FIG. 1, a linear motor 10 comprising a secondary 12 with an attached layer 14 of highly conductive material, a first primary 16 and a second primary 18 is shown schematically. The motor 10 provides motive power for an elevator 20. The elevator 20 comprises an elevator car 22 and a counterweight assembly 24 in a hoistway (not shown), attached to one another by a series of ropes 26 as is known in the art. The counterweight assembly 24 includes the primaries 16,18 of the linear motor 10 and a frame 28 attached to the primaries 16,18. The frame 28 includes a means for attaching weights 30 to the counterweight assembly 24, should additional weight be necessary to balance the load between the elevator car 22 and the counterweight assembly 24. The secondary 12 extends the length of the hoistway, guiding the travel of the counterweight assembly 24 throughout the hoistway.

Figure 2:
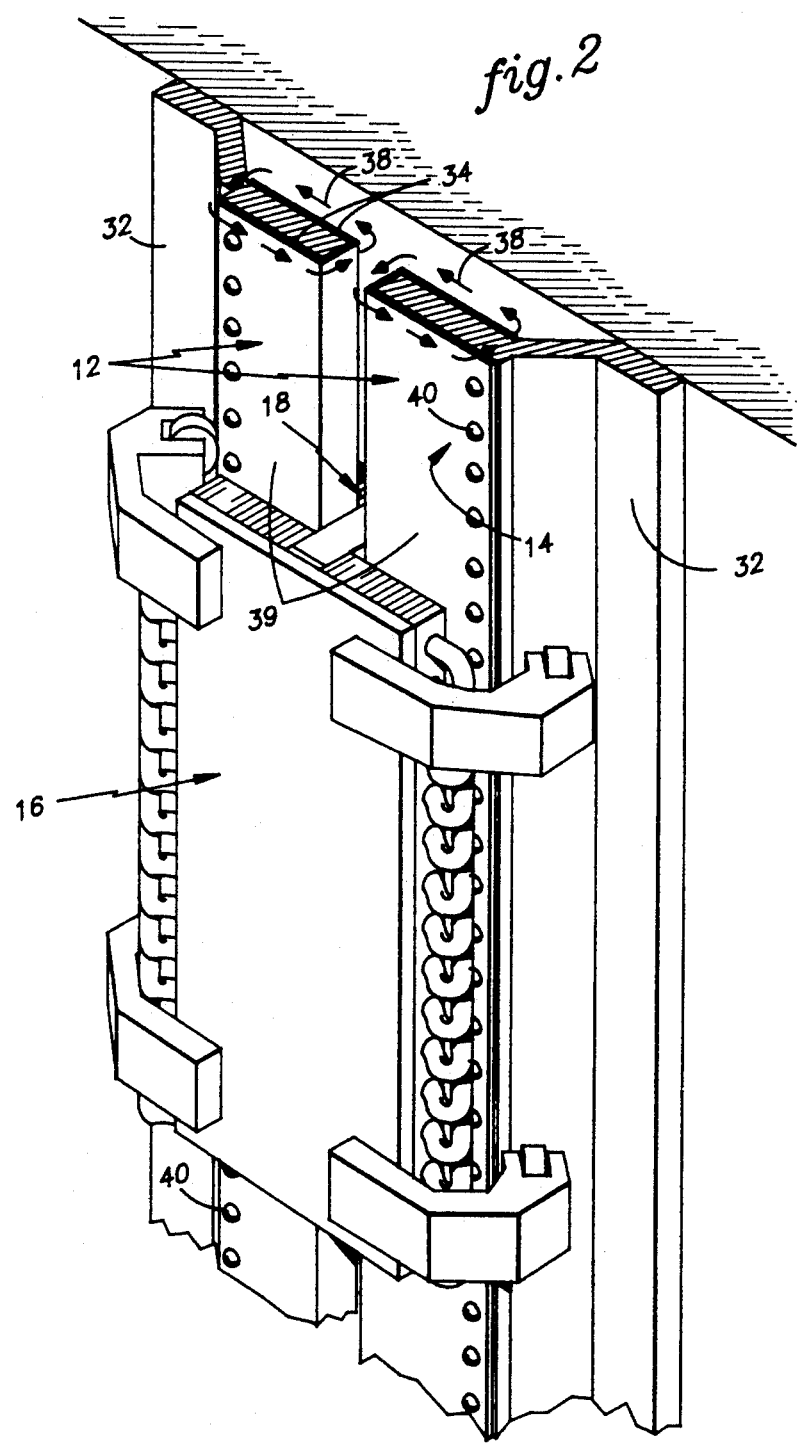
FIG. 2 is a enlarged view of the linear motor shown in FIG. 1, detailing a layer of highly conductive material substantially enclosing a secondary.
Figure 3:
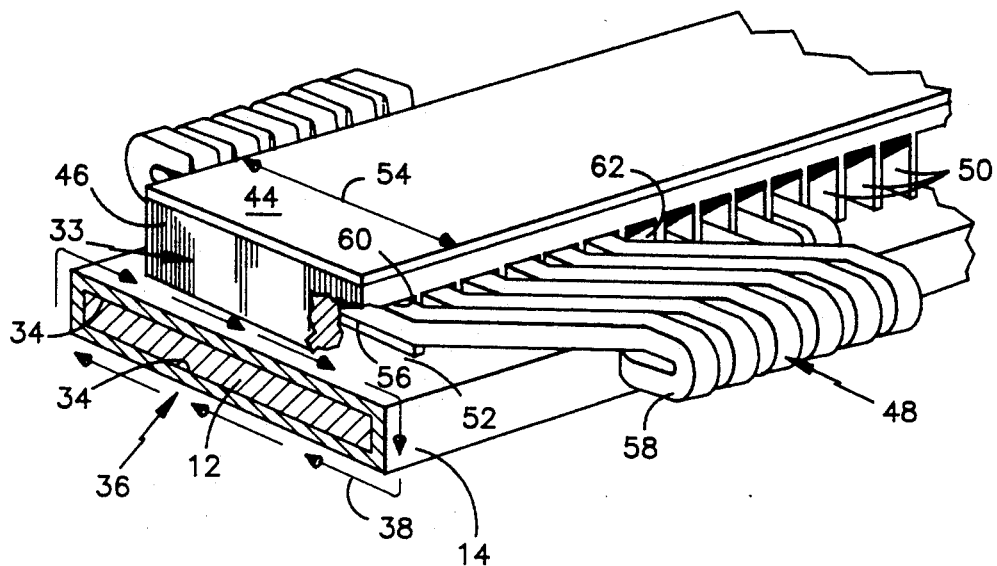
FIG. 3 is a schematic drawing of a linear motor secondary with a layer of highly conductive material completely encircling the secondary.

Referring to FIGS. 2 and 3, the secondary 12 comprises a ferromagnetic material supported and positioned within the hoistway by a pair of flanges 32. A layer 14 of highly conductive material, such as aluminum or copper, is attached to each face 34 of the secondary 12 opposing a primary 16,18,33. In a first embodiment (FIG. 3), the layer 14 completely encircles the cross-section of the secondary 12 perpendicular to the primary 16,18,33. The layer may be formed by spray metallizing or dipping. Alternatively, the layer 14 may comprise sections mechanically attached to one another, by conventional means, to form the encircling layer. Either way, the encircling layer 14 provides a continuous electrical path 38 around the secondary 12 perpendicular to the primary 16,18,33.

Figure 4:
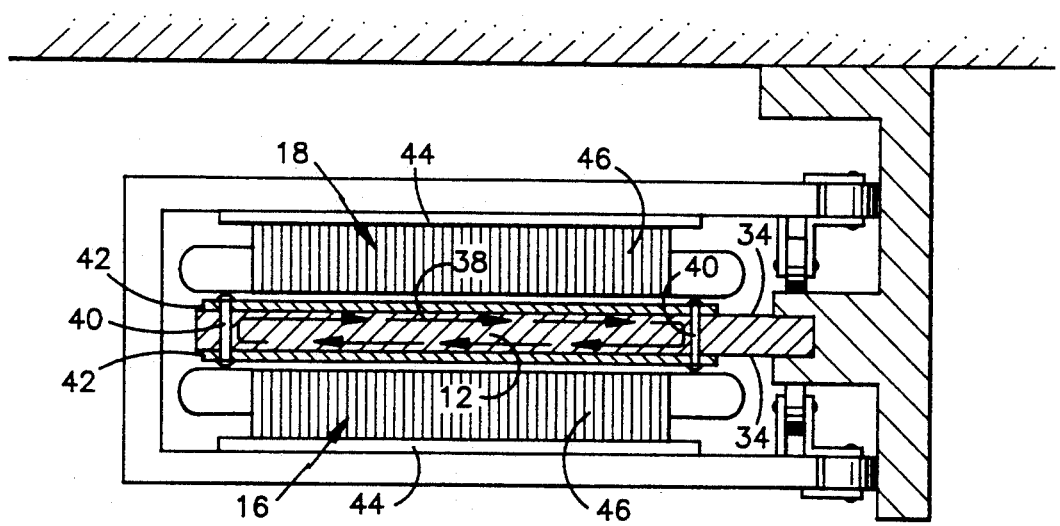
FIG. 4 is a schematic drawing of a linear motor secondary with a sheet of highly conductive material on each face of the secondary facing a primary, connected together by electrically conductive rivets.

In a second embodiment (FIG. 2), the layer 14 substantially encloses the widthwise cross-section of the secondary 12 and is connected into a continuous path by an electrically conductive means. For example, the layer 14 may be "U"-shaped 39. The ends of the "U" are connected by rivets 40, or other electrically conductive means. In a third embodiment, the layer 14 comprises two flat sections 42 (FIG. 4), one on each face 34 of the secondary 12 facing a primary 16,18,33. The two sections 42 are attached to one another by rivets 40, or other electrically conductive means. In either the single "U"-shaped section 39 or the two flat sections 42, a continuous electrical path 38 is created around the secondary 12, perpendicular to the primary(s) 16,18,33.

Referring to FIG. 3, each primary 33 comprises a backing plate 44, a plurality of laminated plates 46 and a plurality of windings 48, as is known in the art. The laminated plates 46, which include a plurality of slots 50, attach to the backing plate 44. The slots 50 cumulatively form channels 52 that run across the width 54 of the primary 33 when the laminated plates 46 are attached to the backing plate 44. The windings or coils 48 rest in the channels 52. Each coil 48 is a complete path having two straight lengths 56 connected together on each side of the primary 33 by a coil end 58. One straight length 56 of the coil 48 rests in a first channel 60 and the other straight length 56 rests in a second channel 62 separated from the first channel by a specific distance generally equal to a pole pitch.

When current passes through a coil 48, a magnetic field is created around the coil 48, perpendicular to the direction of the current. The magnetic field accesses the ferromagnetic material of both the primary 16,18,33 and the secondary 12, thereby creating an attractive force between the primary and secondary.

The currents in the primary coils 48 also produce induced currents 38 within the highly conductive layer 14, directed opposite to the current in the primary coils 48. In the first embodiment (FIG. 3), the induced currents 38 travel within the encircling layer 14 completely around the widthwise cross-section of the secondary 12, perpendicular to the primary 33. In the second embodiment (FIGS. 2 & 4), the induced currents 38 travel through both the layer 14 and the rivets 40 connecting the layer in a continuous path. In the third embodiment, the induced currents 38 travel through the sections 42 and the rivets 40. The second and third embodiments, therefore, allow the induced current 38 to travel substantially, if not completely, around the secondary 12, perpendicular to the primary 16,18,33. The induced currents follow the aforementioned perpendicular paths because they are the paths of the least resistance. The induced currents 38 interact with the magnetic field created by the current passing through the primary coils 48 to create a thrust force on the primary 16,18,33. The strength of the induced current 38 is directly related to the strength of the thrust force on the primary 16,18,33.

Although this invention has been shown and described with respect to the detailed embodiments thereof, it will be understood by those skilled in the art that various changes in form and detail thereof may be made without departing from the spirit and scope of the claimed invention.

We claim:

1. A linear motor, for providing motive force to an elevator in a hoistway, having a secondary with a width and a primary with a face defined by a width and electrically conductive coils across the width of the primary, comprising:

a layer of electrically conductive material completely encircling the widthwise cross-section of the secondary, wherein induced currents, created by current running through the electrically conductive coils of the primary, travel a path within said layer, perpendicular to the face of the primary.

2. A linear motor, for providing motive force to an elevator in a hoistway, having a secondary with a width and a primary with a face defined by a width and electrically conductive coils across the width of the primary, comprising:

a layer of electrically conductive material substantially enclosing the widthwise cross-section of the secondary; and an electrically conductive means for connecting said substantially enclosing layer in a continuous path around the widthwise cross-section of the secondary, wherein induced currents, created by current running through the electrically conductive coils of the primary, travel a path within said layer, perpendicular to the face of the primary.

3. A linear motor, for providing motive force to an elevator in a hoistway, having a secondary with a width and a primary with a face defined by a width and electrically conductive coils across the width of the primary, comprising:

a plurality of sections of electrically conductive material attached to the secondary; and an electrically conductive means for connecting said sections in a continuous path around the widthwise cross-section of the secondary, wherein induced currents, created by current running through the electrically conductive coils of the primary, travel a path within said sections and said means, perpendicular to the face of the primary.

* * * * *